US011323601B2

(12) United States Patent
Iinuma

(10) Patent No.: US 11,323,601 B2
(45) Date of Patent: May 3, 2022

(54) APPARATUS BODY OF IMAGE PICKUP APPARATUS AND LENS ADAPTER FOR EQUIPPING INTERCHANGEABLE LENS TO APPARATUS BODY

(71) Applicant: CANON KABUSHIKI KAISHA, Tokyo (JP)

(72) Inventor: Futoshi Iinuma, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/876,245

(22) Filed: May 18, 2020

(65) Prior Publication Data

US 2020/0280660 A1    Sep. 3, 2020

Related U.S. Application Data

(63) Continuation of application No. 15/082,502, filed on Mar. 28, 2016, now Pat. No. 10,764,477.

(30) Foreign Application Priority Data

Mar. 31, 2015 (JP) ................................. 2015-071987
Mar. 31, 2015 (JP) ................................. 2015-071988

(51) Int. Cl.
*H04N 5/225* (2006.01)
*H04N 5/232* (2006.01)
(Continued)

(52) U.S. Cl.
CPC ........... *H04N 5/2254* (2013.01); *G02B 7/026* (2013.01); *G02B 7/14* (2013.01); *G03B 17/14* (2013.01);
(Continued)

(58) Field of Classification Search
None
See application file for complete search history.

(56) References Cited

U.S. PATENT DOCUMENTS 4,653,889 A    3/1987 Haneishi
5,652,921 A    7/1997 Kawano
(Continued)

FOREIGN PATENT DOCUMENTS

CN    2056546 U    4/1990
CN    1285939 C    11/2006
(Continued)

OTHER PUBLICATIONS

Author: Red Title: DSMC Canon Mount Installation Instructions Date: Dec. 18, 2011 (Year: 2011).*
(Continued)

*Primary Examiner* — Timothy J Henn
*Assistant Examiner* — Wesley J Chiu
(74) *Attorney, Agent, or Firm* — Cowan, Liebowitz & Latman, P.C.

(57) ABSTRACT

An apparatus body of an image pickup apparatus that ensures reliability of an electric connection between a lens adapter and the apparatus body with a simple configuration even when a spacer is inserted between the lens adapter that has an electrical communication unit and the apparatus body. A lens adapter to which an interchangeable lens is detachably attached is detachably attached to a fixing unit. An electrical connecting portion is formed as a comb-shaped terminal that is electrically connected with a terminal of the electrical communication unit provided in the lens adapter. A contact portion of the comb-shaped terminal contacting with the terminal of the electrical communication unit is slidable with respect to the terminal of the electrical communication unit.

6 Claims, 15 Drawing Sheets

(51) Int. Cl.
*H04N 5/217* (2011.01)
*G02B 7/14* (2021.01)
*G02B 7/02* (2021.01)
*G03B 17/14* (2021.01)
*G03B 17/56* (2021.01)

(52) U.S. Cl.
CPC ....... *H04N 5/2171* (2013.01); *H04N 5/23209* (2013.01); *G03B 17/565* (2013.01)

(56) References Cited

U.S. PATENT DOCUMENTS

| | | | | |
|---|---|---|---|---|
| 6,299,492 | B1* | 10/2001 | Pierini | H01R 13/26 439/884 |
| 7,976,317 | B2 | 7/2011 | Patel et al. | |
| 2005/0025472 | A1* | 2/2005 | Sugita | G03B 17/14 396/71 |
| 2007/0035705 | A1 | 2/2007 | Hurd | |
| 2008/0304818 | A1 | 12/2008 | Kranz et al. | |
| 2010/0111517 | A1 | 5/2010 | Yasuda | |
| 2010/0165188 | A1* | 7/2010 | Jannard | H04N 5/2251 348/375 |
| 2010/0325825 | A1 | 12/2010 | Kawai | |
| 2011/0052185 | A1 | 3/2011 | Urakami et al. | |
| 2011/0164171 | A1 | 7/2011 | Yasuda et al. | |
| 2013/0286264 | A1 | 10/2013 | Kamikura et al. | |
| 2014/0233936 | A1* | 8/2014 | Imafuji | G03B 17/565 396/529 |
| 2015/0070557 | A1 | 3/2015 | Petty et al. | |
| 2016/0295083 | A1 | 10/2016 | Iinuma | |
| 2016/0330354 | A1 | 11/2016 | Moriyama et al. | |

FOREIGN PATENT DOCUMENTS

| | | |
|---|---|---|
| CN | 102150080 A | 8/2011 |
| CN | 102334066 A | 1/2012 |
| CN | 104471923 A | 3/2015 |
| EP | 0372459 A2 | 12/1989 |
| EP | 1786074 A1 | 5/2007 |
| GB | 2158957 A | 11/1985 |
| JP | 51-135529 A | 11/1976 |
| JP | 62-140528 U | 9/1987 |
| JP | 07-084307 A | 3/1995 |
| JP | 11-327022 A | 11/1999 |
| JP | 2002156695 A | 5/2002 |
| JP | 2005-070711 A | 3/2005 |
| JP | 2005-148672 A | 6/2005 |
| JP | 03870183 B2 | 1/2007 |
| JP | 2007-286201 A | 11/2007 |
| JP | 2010-072225 A | 4/2010 |
| JP | 2011-053437 A | 3/2011 |
| JP | 2013-218151 A | 10/2013 |
| JP | 2013-232015 A | 11/2013 |
| JP | 2014503961 A | 2/2014 |
| KR | 10-1617792 B1 | 5/2016 |

OTHER PUBLICATIONS

The above patent documents were cited in a Feb. 1, 2021 Chinese Office Action, which is enclosed with an English Translation, that issued in Chinese Patent Application No. 202010349848.0.
A European Partial Search Report dated Aug. 4, 2016, which is enclosed, that issued in the corresponding European Patent Application No. 16163139.5. Submitted in parent U.S. Appl. No. 15/082,502.
A European Search Report dated Dec. 7, 2016, which is enclosed, that issued in the corresponding European Patent Application No. 16163139.5. Submitted in parent U.S. Appl. No. 15/082,502.
A European Search Report dated Dec. 8, 2017, which is enclosed, that issued in the corresponding European Patent Application No. 17178735.1. Submitted in parent U.S. Appl. No. 15/082,502.
A Jan. 8, 2019 Office Action, which is enclosed without an English Translation, that issued in Japanese Patent Application No. 2015-071987. Submitted in parent U.S. Appl. No. 15/082,502.
A Jan. 17, 2020 Notice of Allowance, which is enclosed without an English Translation, that issued in Korean Patent Application No. 10-2016-0035054. Submitted in parent U.S. Appl. No. 15/082,502.
Author: Red Digital Camera; Title: DSMC Canon Mount Installation Instructions, Version 2.0; Date: Dec. 18, 2011. Submitted in parent U.S. Appl. No. 15/082,502.
The above foreign patent documents were cited in the May 12, 2020 Japanese Office Action, which is enclosed without an English Translation, that issued in Japanese Patent Application No. 2019086057.

* cited by examiner

APPARATUS BODY OF IMAGE PICKUP APPARATUS AND LENS ADAPTER FOR EQUIPPING INTERCHANGEABLE LENS TO APPARATUS BODY

CROSS-REFERENCE TO RELATED APPLICATION

This application is a continuation of application Ser. No. 15/082,502, filed Mar. 28, 2016, the entire disclosure of which is hereby incorporated by reference.

BACKGROUND OF THE INVENTION

Field of the Invention

The present invention relates to an apparatus body of an image pickup apparatus like a digital camera to which an interchangeable lens is detachably attached through a lens adapter having an electrical communication unit, and to the lens adapter for equipping the interchangeable lens to the apparatus body.

Description of the Related Art

When a lens mount of an interchangeable lens has a different shape from a lens mount of a camera body of a lens interchangeable camera, the interchangeable lens is detachably attached to the camera body through a lens adapter. Moreover, some lens adapters have an electrical communication unit in order to enable communication between an interchangeable lens and a camera body.

Since a lens adapter having an electrical communication unit has many contact members that electrically connect the electrical communication unit and a camera body, reliability of the electric connection of the contact members of the lens adapter with the contact members of the camera body and durability of contact parts are needed.

Consequently, there is a proposed technique that constitutes both of the contact members of the lens adapter and the contact members of the camera body as a plurality of movable contact pins that are movably supported in an optical axis direction and are energized so that the pins are mutually contact to each other (Japanese Laid-Open Patent Publication (Kokai) No. H7-84307 (JP H7-84307A)).

However, the configuration of the above-mentioned publication changes the contact positions between the contact pins of the lens adapter and the contact pins of the camera body when a spacer is inserted into a space between the lens adapter and the camera body in order to finely adjust a flange back (a distance from the lens adapter to an image pickup device). Accordingly, there is a possibility that contact pressure between the contact pins of the lens adapter and the contact pins of the camera body varies, which deteriorates the reliability of electric connection.

On the other hand, there is a proposed lens adapter that is attached to a lens mount of a camera body so as to cover a collapsible lens barrel as a dustproof lens adapter for attaching a wide converter as an interchangeable lens (Japanese Laid-Open Patent Publication (Kokai) No. 2010-72225 (JP 2010-72225A)).

When an interchangeable lens is attached to a camera body through a lens adapter, a dustproof measure that prevents invasion of foreign substances through a gap between the lens adapter and the camera body will be needed. When there is a gap between a lens adapter and a camera body, foreign substances, such as dust, may be invaded on an optical path of an interchangeable lens and is taken in an image, which deteriorates image quality.

On the other hand, when a lens adapter has an electrical communication unit that enables communication between an interchangeable lens and a camera body, it is difficult to seal the electrical communication unit of an uneven shape by a dustproof member. In particular, when the interchangeable lens is attached to the camera body by a rotary operation of the lens adapter, the dustproof measure of the electrical communication unit becomes more difficult.

However, J P 2010-72225A does not disclose any dustproof measure between a lens adapter that has an electrical communication unit and a camera body. Moreover, since an air hole is formed on an exterior of the camera body in order to avoid an adverse influence on a collapsing operation by pressure variation in a space between the camera body and the lens adapter when the lens barrel is collapsed, dust etc. may invade inside of the camera body through the air hole.

SUMMARY OF THE INVENTION

The present invention provides a technique that ensures reliability of an electric connection between a lens adapter and an apparatus body with a simple configuration even when a spacer is inserted between the lens adapter that has an electrical communication unit and the apparatus body of an image pickup apparatus. Moreover, the present invention provides a technique that ensures a dustproof performance between the lens adapter and the apparatus body of the mage pickup apparatus even when the lens adapter has the electrical communication unit.

Accordingly, a first aspect of the present invention provides an apparatus body of an image pickup apparatus including a fixing unit to which a lens adapter to which an interchangeable lens is detachably attached is detachably attached, and an electrical connecting portion that is formed as a comb-shaped terminal that is electrically connected with a terminal of an electrical communication unit provided in the lens adapter. A contact portion of the comb-shaped terminal contacting with the terminal of the electrical communication unit is slidable with respect to the terminal of the electrical communication unit.

Accordingly, a second aspect of the present invention provides a lens adapter including an electrical communication unit that includes a first electric connecting portion that is detachably attached to an apparatus body of an image pickup apparatus so as to be electrically connected to the apparatus body and a second electrical connecting portion to which an interchangeable lens is detachably attached carried so as to be electrically connected with the interchangeable lens, and enables communication between the apparatus body and the interchangeable lens, and a ring-shaped elastic member of which a part in circumferential direction is in pressure contact with a wall portion of the electrical communication unit at a side of the second electrical connecting portion in an optical axis direction. The remaining part of the ring-shaped elastic member in the circumferential direction is in pressure contact with the apparatus body in the optical axis direction in a situation where the ring-shaped elastic member is fixed to the apparatus body.

According to the present invention, the reliability of the electric connection between the lens adapter and the apparatus body is ensured with the simple configuration even when the spacer is inserted between the lens adapter that has the electrical communication unit and the apparatus body of the image pickup apparatus. Moreover, according to the present invention, the dustproof performance between the lens adapter and the apparatus body of the mage pickup apparatus is ensured even when the lens adapter has the electrical communication unit.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
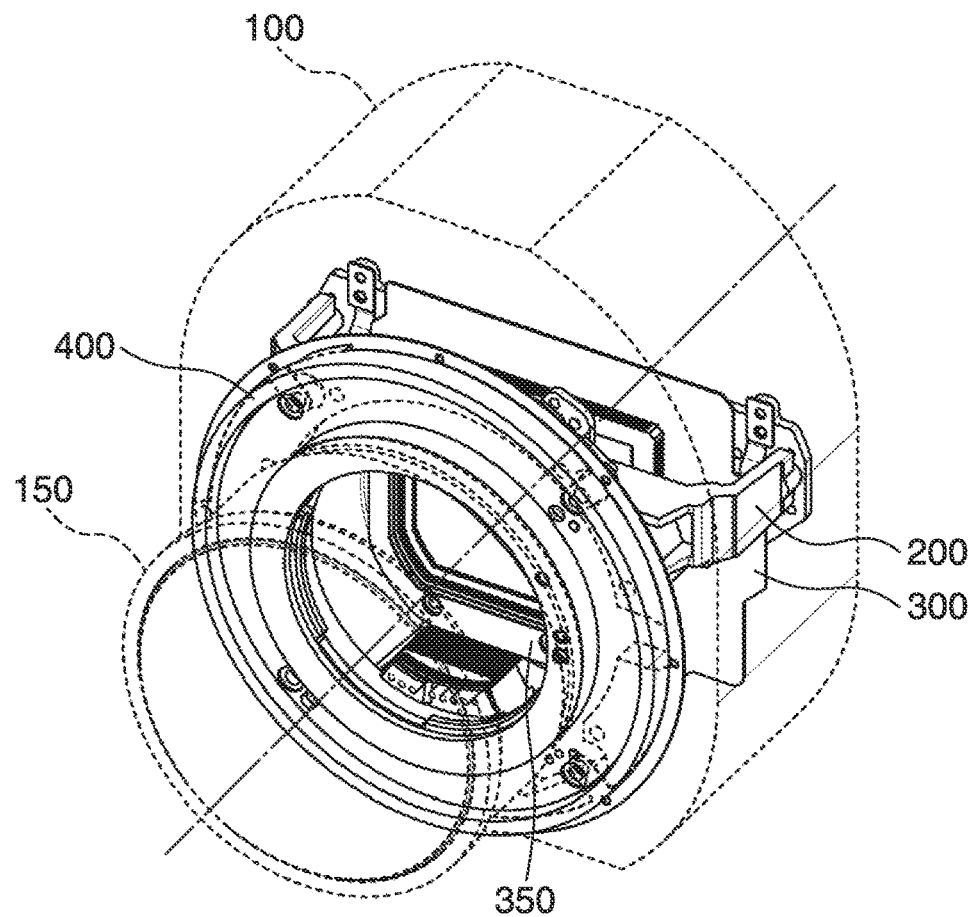
FIG. 1 is a perspective view of a digital camera as an example of an embodiment of an image pickup apparatus of the present invention viewed from a front side (an object side) in a state where an interchangeable lens is attached to a camera body of the digital camera through a lens adapter.

FIG. 1 is a perspective view of a digital camera as an example of an embodiment of an image pickup apparatus of the present invention viewed from a front side (an object side) in a state where an interchangeable lens 150 is attached to a camera body 100 of the digital camera through a lens adapter 400. It should be noted that the camera body 100 and the interchangeable lens 150 are indicated by broken lines in FIG. 1 for a purpose of description. Moreover, although the embodiment shows the digital camera as an example of the image pickup apparatus, the present invention is not limited to the embodiment.

As shown in FIG. 1, the interchangeable lens 150 is detachably attached to a front side of the camera body 100 through the lens adapter 400. An image-pickup-device unit 300, an image-pickup-device protection unit 350, and a fixing unit 200 are disposed in the camera body 100.

Figure 2:
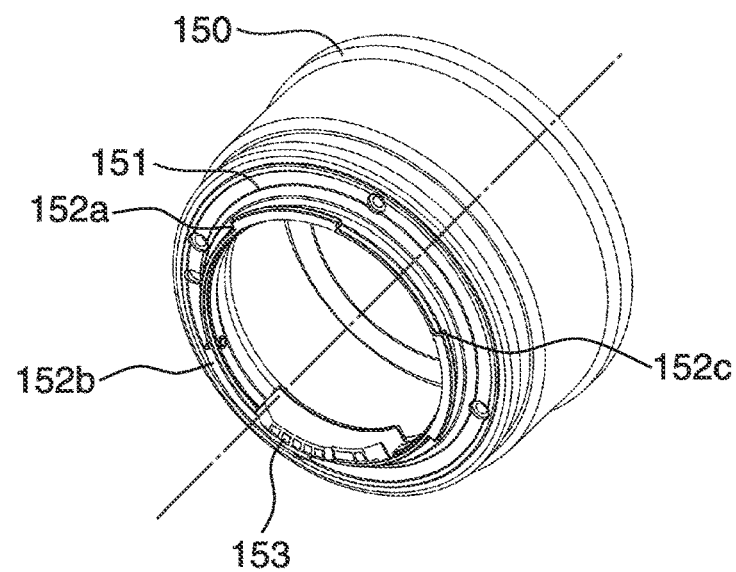
FIG. 2 is a perspective view showing the interchangeable lens shown in FIG. 1 viewed from a rear side.

FIG. 2 is a perspective view showing the interchangeable lens 150 shown in FIG. 1 viewed from a rear side (an attachment side to the camera body 100). As shown in FIG. 2, a mount portion 151 is provided at the rear side of the interchangeable lens 150. Engaging claws 152a through 152c are provided inside the mount portion 151 in a radial direction at nearly regular intervals in a circumferential direction. Moreover, an electrical connecting portion 153 is provided between the engaging claw 152b and the engaging claw 152c at the rear side of the interchangeable lens 150.

Figure 3A:
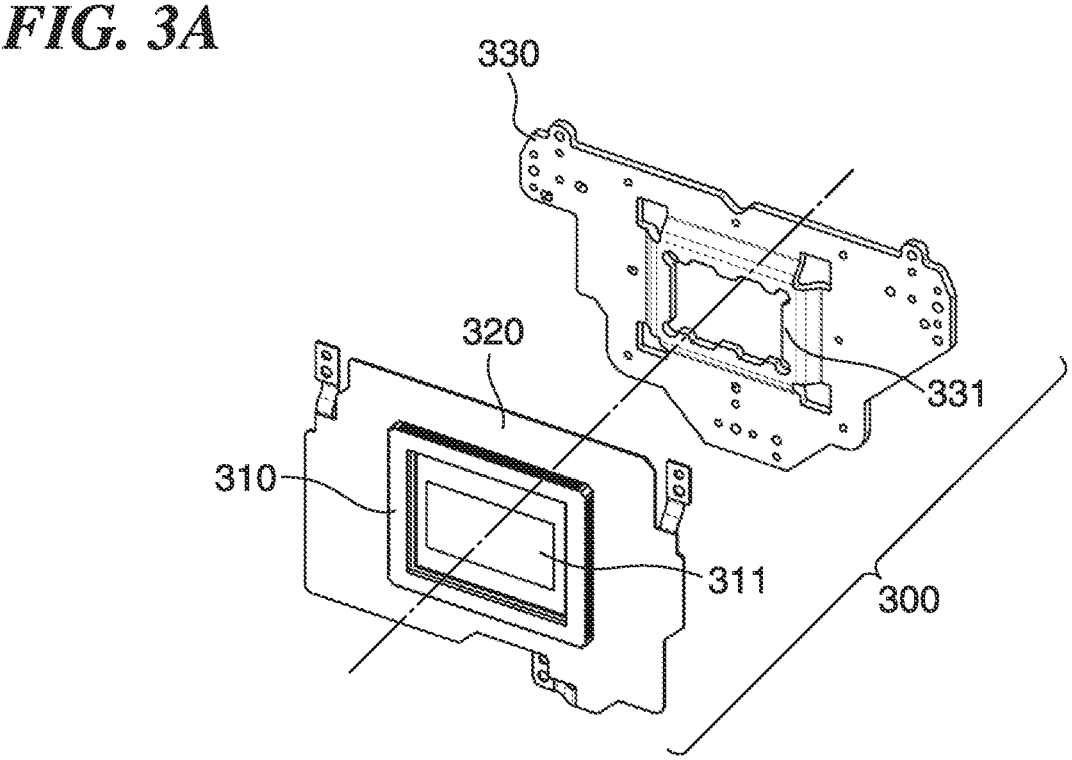
FIG. 3A is an exploded perspective view of an image-pickup-device unit shown in FIG. 1 viewed from the front side.
Figure 3B:
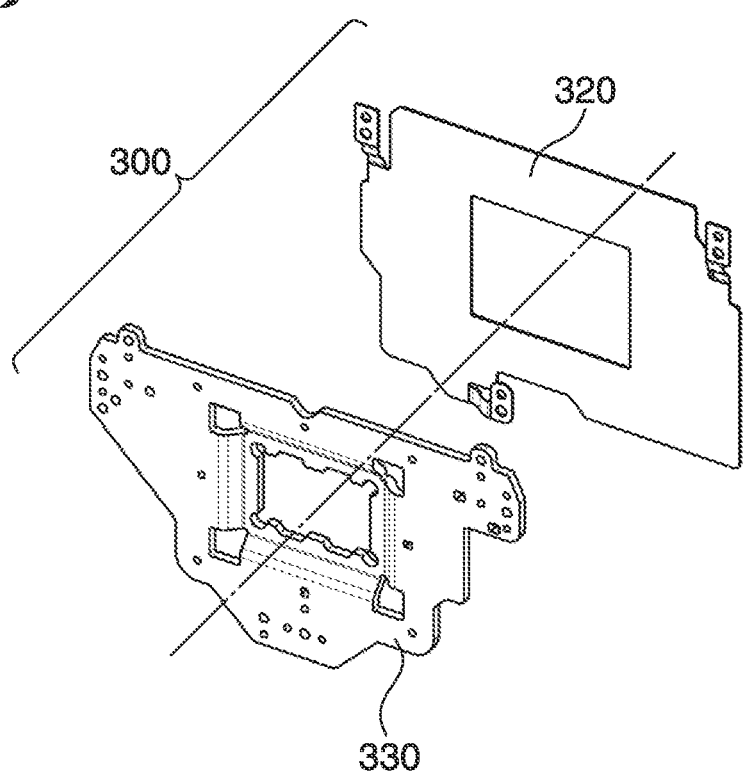
FIG. 3B is an exploded perspective view of the image-pickup-device unit shown in FIG. 3A viewed from the rear side.

FIG. 3A is an exploded perspective view of an image-pickup-device unit 300 shown in FIG. 1 viewed from the front side. FIG. 3B is an exploded perspective view of the image-pickup-device unit 300 shown in FIG. 3A viewed from the rear side. As shown in FIG. 3A and FIG. 3B, the image-pickup-device unit 300 is provided with an image pickup device 310, a device substrate 320 on which the image pickup device 310 is mounted, and a holding member 330 that holds the image pickup device 310 mounted on the device substrate 320.

The image pickup device 310 photoelectrically converts a subject image formed on an image pickup surface 311 by light passing through the interchangeable lens 150, and outputs an image signal. The device substrate 320 applies a predetermined process to the image signal output from the image pickup device 310, and outputs the processed signal to a main substrate (not shown). A fixing portion 331 is provided in the center of the holding member 330, and the image pickup device 310 mounted on the device substrate 320 is fixed to the fixing portion 331 by adhesion etc.

Figure 4A:
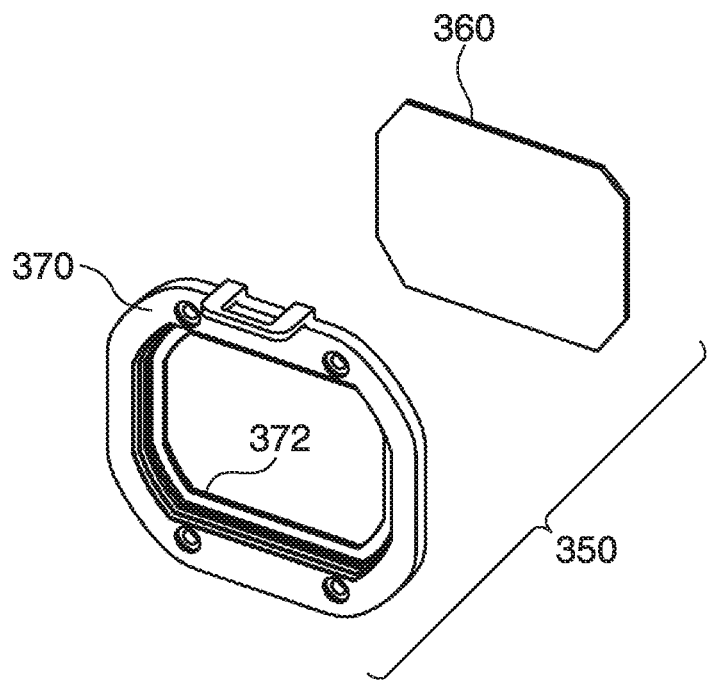
FIG. 4A is an exploded perspective view of an image-pickup-device protection unit shown in FIG. 1 viewed from the front side.
Figure 4B:
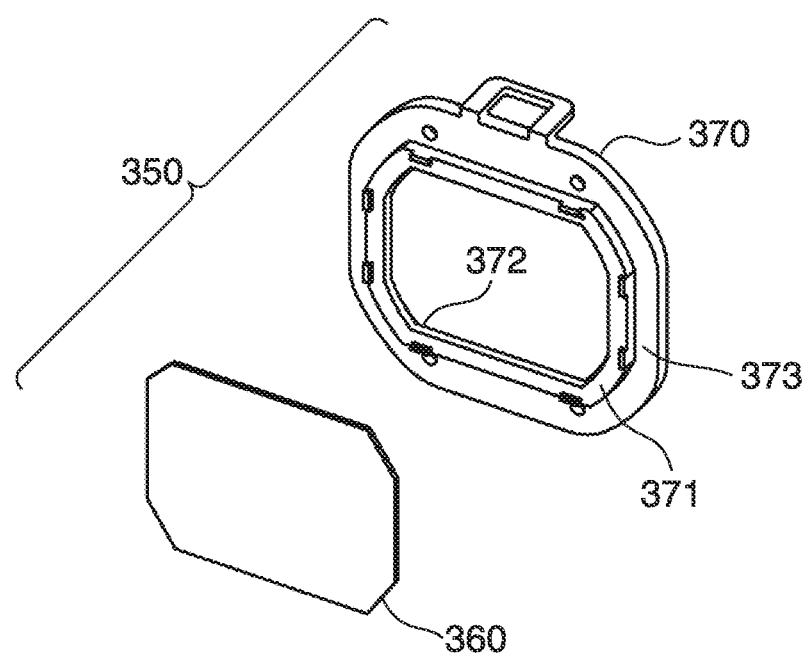
FIG. 4B is an exploded perspective view of the image-pickup-device protection unit shown in FIG. 4A viewed from the rear side.

FIG. 4A is an exploded perspective view of the image-pickup-device protection unit 350 shown in FIG. 1 viewed from the front side. FIG. 4B is an exploded perspective view of the image-pickup-device protection unit 350 shown in FIG. 4A viewed from the rear side. The image-pickup-device protection unit 350 is arranged between the lens adapter 400 and the image-pickup-device unit 300, and is provided with a holding member 370 of an approximately rectangular frame shape that has an exposure opening 372 in the center as shown in FIG. 4A and FIG. 4B. A fixing portion 371 projected toward the image pickup device 310 is provided around the exposure opening 372 at the rear side of the holding member 370. A glass member 360 is fixed to the fixing portion 371 with double-stick tape etc. Moreover, a contact portion 373 that is in surface contact with the fixing unit 200 is provided around the fixing portion 371 of the holding member 370.

Figure 5A:
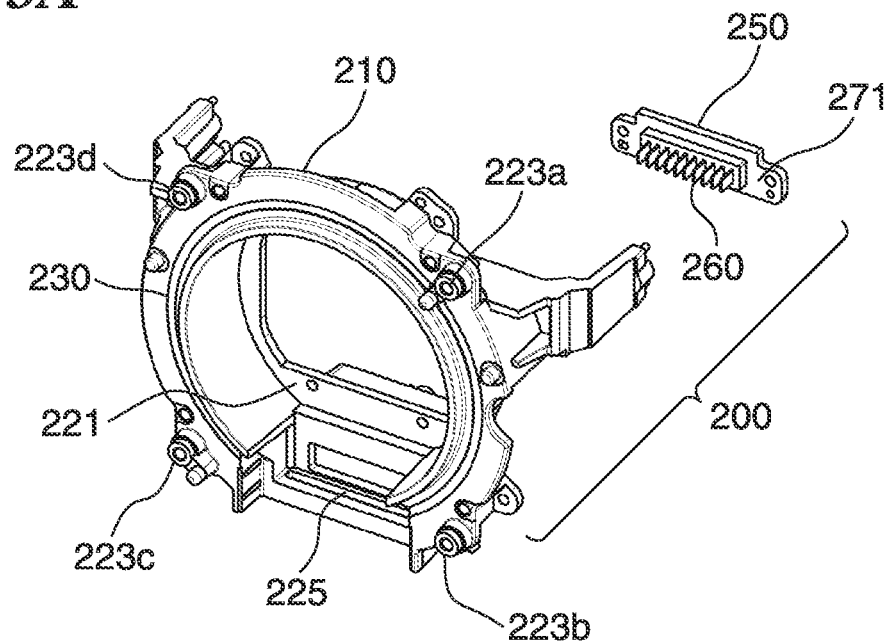
FIG. 5A is an exploded perspective view of a fixing unit shown in FIG. 1 viewed from the front side.
Figure 5B:
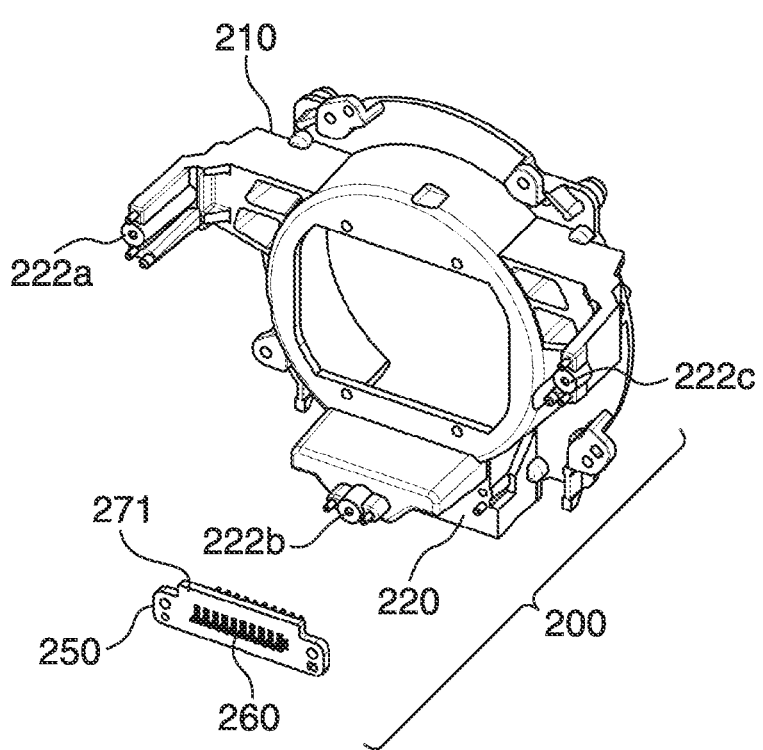
FIG. 5B is an exploded perspective view of the fixing unit shown in FIG. 5A viewed from the rear side.
Figure 6:
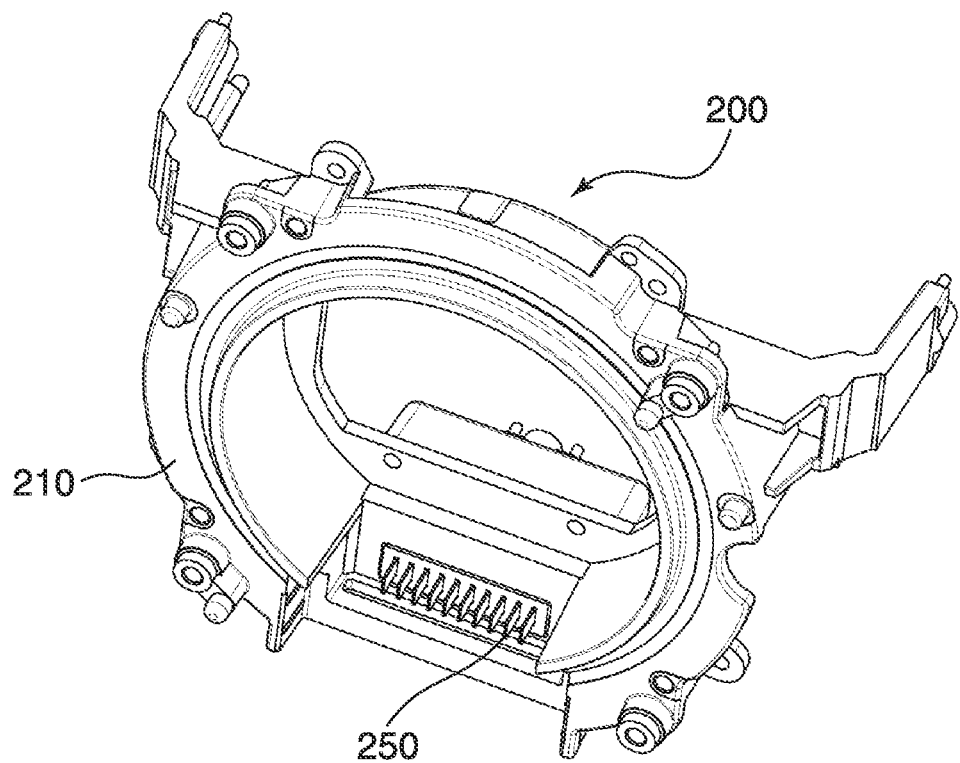
FIG. 6 is a perspective view of an assembly of the fixing unit shown in FIG. 5A.
Figure 7A:
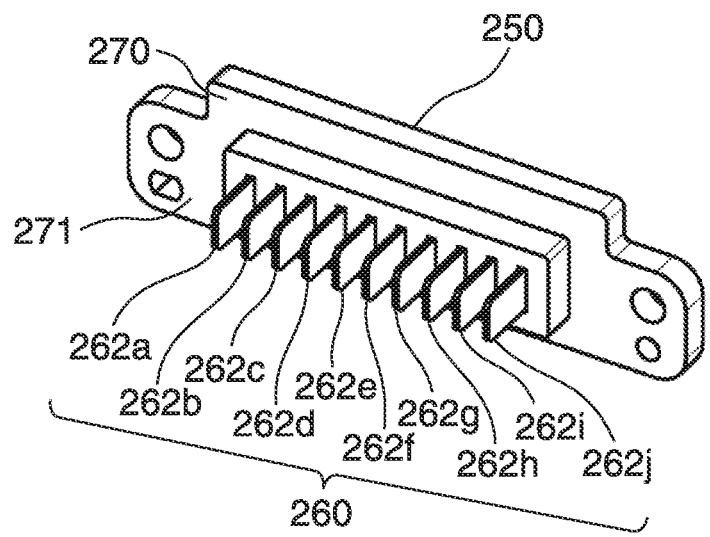
FIG. 7A is a perspective view of an electrical communication unit that constitutes the fixing unit shown in FIG. 5A viewed from the front side.
Figure 7B:
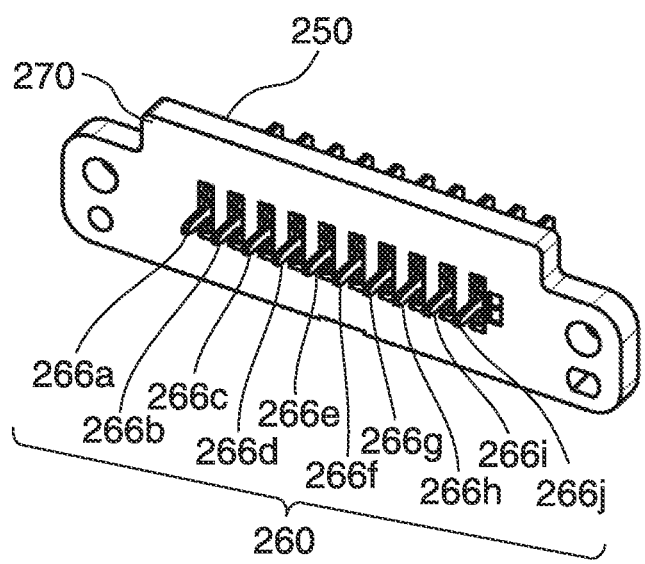
FIG. 7B is a perspective view of the electrical communication unit shown in FIG. 7A viewed from the rear side.

FIG. 5A is an exploded perspective view of the fixing unit 200 shown in FIG. 1 viewed from the front side. FIG. 5B is an exploded perspective view of the fixing unit 200 shown in FIG. 5A viewed from the rear side. FIG. 6 is a perspective view of an assembly of the fixing unit 200 shown in FIG. 5A. FIG. 7A is a perspective view of an electrical communication unit 250 that constitutes the fixing unit 200 shown in FIG. 5A viewed from the front side. FIG. 7B is a perspective view of the electrical communication unit 250 shown in FIG. 7A viewed from the rear side.

As shown in FIG. 5A, FIG. 5B, and FIG. 6, the fixing unit 200 has a fixing member 210 exhibiting a ring shape approximately. As shown in FIG. 5A, a fixing portion 221 to which the image-pickup-device protection unit 350 is fixed, and fixing portions 223a through 223d to which the lens adapter 400 is fixed are provided on the front side of the fixing member 210. Moreover, a contact portion 230 to which a ring-shaped elastic member 490 (mentioned below, see FIG. 12) of the lens adapter 400 contacts in an optical axis direction is formed in the front side of the fixing member 210. An air hole 225 is formed in the bottom of the fixing member 210.

The air hole 225 is formed in an area where ventilation resistance between the lens adapter 400 and the image-pickup-device protection unit 350 is minimized in a state where the interchangeable lens 150 is attached to the camera body 100 through the lens adapter 400.

Accordingly, when air flows in this area due to a focusing operation, a zoom operation, etc. of the interchangeable lens 150, the air flows toward the air hole 225. That is, foreign substances, such as dust, which are floating in the area between the lens adapter 400 and the image-pickup-device protection unit 350, are guided to the air hole 225. When a cleaning filter, an adhesive, etc. is arranged in the air hole 225 to adhere foreign substances, it is avoidable that foreign substances remain in the area between the lens adapter 400 and the image-pickup-device protection unit 350.

A contact portion 373 provided in the holding member 370 of the image-pickup-device protection unit 350 is in surface contact with the fixing portion 221. Accordingly, the contact portion of the members implements a sealed structure, which avoids invasion of foreign substances, such as dust, into the image-pickup-device unit 300 through the contact portion of the members.

On the other hand, as shown in FIG. 5B, a fixing portion 220 to which the electrical communication unit 250 is fixed, and fixing portions 222a through 222c to which the image-pickup-device unit 300 is fixed are provided in the rear side of the fixing member 210. The electrical communication unit 250 has a holding member 270 that holds a terminal member 260.

A contact portion 271 provided in the holding member 270 of the electrical communication unit 250 is in surface contact with the fixing portion 220. Accordingly, the contact portion of the members implements a sealed structure, which avoids invasion of foreign substances, such as dust, into the side of the image-pickup-device unit 300 through the contact portion of the members. Moreover, the terminal member 260 is formed on the holding member 270 by means of insert molding, and thereby the sealing structure that avoids invasion of foreign substances, such as dust, through the contact portion between the holding member 270 and the terminal members 260 is implemented.

The terminal member 260 has contact members 262a through 262j that consist of plate terminals and contact members 266a through 266j that consist of pin like terminals. The contact members 262a through 262j are formed to be projected toward the side of the lens adapter 400 in the optical axis direction. The contact members 266a through 266j are formed to be projected toward the side of the image pickup device 310 in the optical axis direction. The terminal member 260 is equivalent to an example of the electrical connecting portion of the present invention.

The fixing portions 222a through 222c are fixed to the image-pickup-device unit 300 through a spacer (not shown). Insertion of the spacer between the fixing portions 222a through 222c and the image-pickup-device unit 300 enables to adjust a flange back. A flange back is specified for every type of lens adapter, and is a distance between a mount portion 411 of a fixed mount member 410 mentioned below (see FIG. 8A) and the image pickup surface 311 of the image pickup device 310 of the image-pickup-device unit 300 in this embodiment.

Figure 8A:
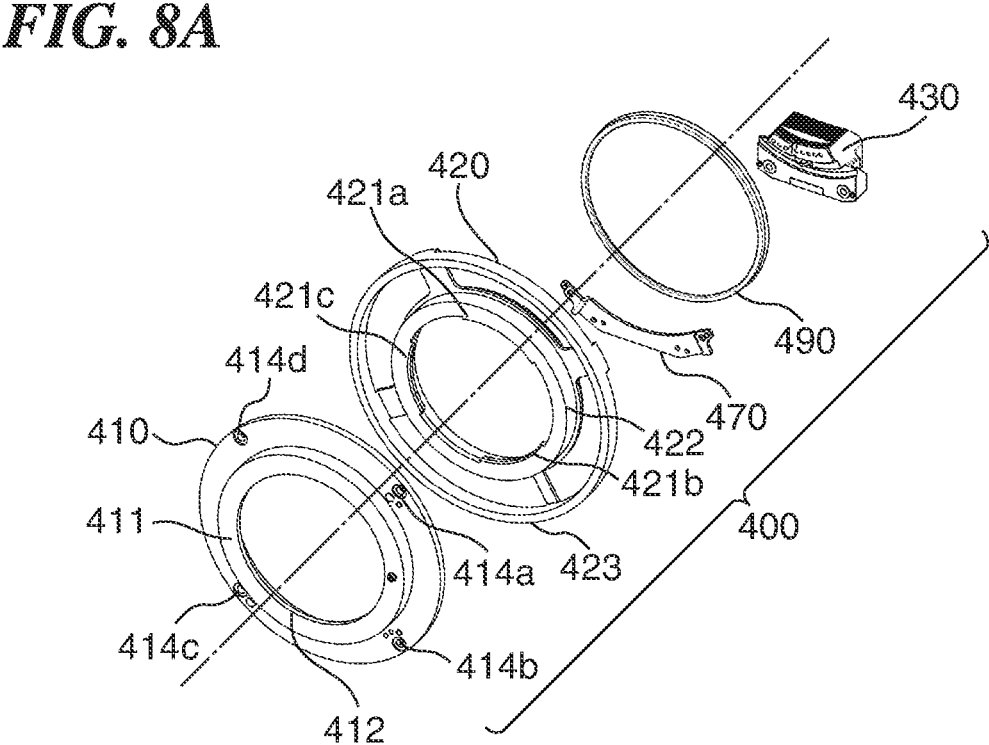
FIG. 8A is an exploded perspective view of a lens adapter shown in FIG. 1 viewed from the front side.
Figure 8B:
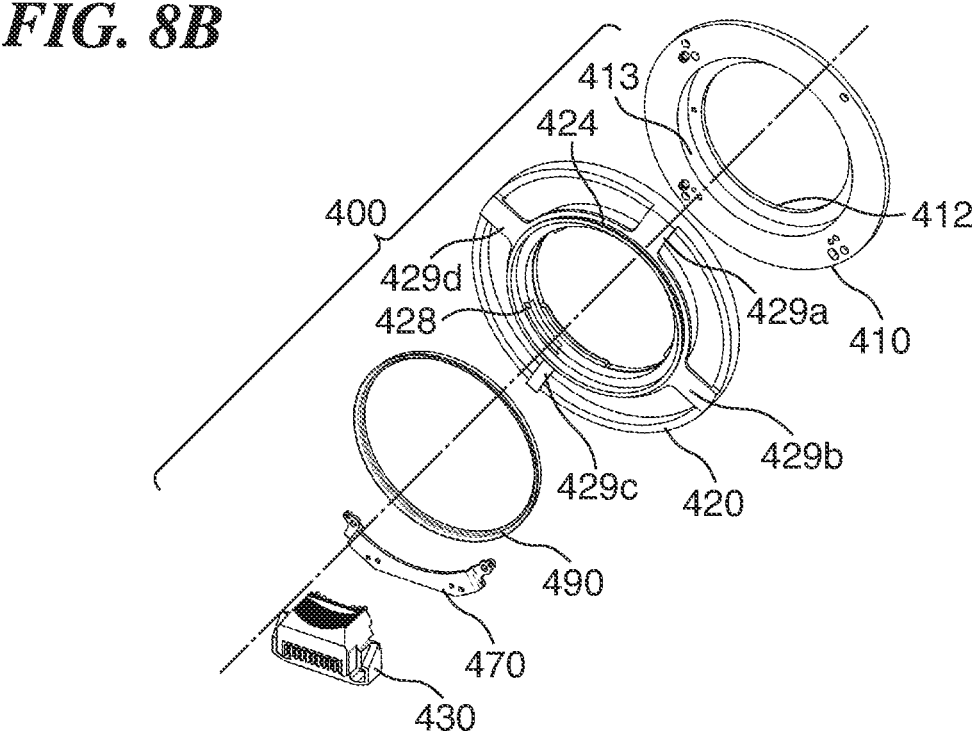
FIG. 8B is an exploded perspective view of the lens adapter shown in FIG. 8A viewed from the rear side.

FIG. 8A is an exploded perspective view of the lens adapter 400 shown in FIG. 1 viewed from the front side. FIG. 8B is an exploded perspective view of the lens adapter 400 shown in FIG. 8A viewed from the rear side. As shown in FIG. 8A and FIG. 8B, the lens adapter 400 has the fixed mount member 410, a movable mount member 420, an electrical communication unit 430, a holding member 470, and the elastic member 490.

As shown in FIG. 8A, a central opening 412 into which the engaging claws 152a through 152c of the interchangeable lens 150 are inserted is formed in the fixed mount member 410. The circular mount portion 411 projected to the front side is provided around the central opening 412. The mount portion 411 contacts with the mount portion 151 of the interchangeable lens 150 in the optical axis direction.

Screw insertion holes 414a through 414d are formed in the outer periphery of the mount portion 411 of the fixed mount member 410 in the radial direction at nearly regular intervals in a circumferential direction. Moreover, as shown in FIG. 8B, a rear inner peripheral portion of the fixed mount member 410 is formed so that its diameter is larger than that of the central opening 412. A female thread portion 413 is formed in the inner periphery concerned.

As shown in FIG. 8A, the movable mount member 420 is arranged behind the fixed mount member 410, and has a cylindrical male thread portion 422 that is screwed with the female thread portion 413 of the fixed mount member 410.

Engaging claws 421a through 421c are formed on a front inner periphery of the male thread portion 422 at nearly regular intervals in the circumferential direction so as to be releasably engaged with the engaging claws 152a through 152c of the interchangeable lens 150 in a rotating direction. Arms 429a through 429d projected outward in the radial direction are provided in a rear outer periphery of the male thread portion 422 at nearly regular intervals in the circumferential direction. The arms 429a through 429d are connected to a circular operating portion 423 arranged outside the male thread portion 422 in the radial direction so as to be approximately coaxial.

Moreover, as shown in FIG. 8B, a circular contact portion 424 to which the elastic member 490 is fitted is provided in the rear side of the male thread portion 422 so as to be projected to the rear side. A detection concave portion 428 is provided in the rear inner peripheral portion of the male thread portion 422.

Then, the interchangeable lens 150 is fixed to the lens adapter 400 by rotating the operating portion 423 of the movable mount member 420 in a state where the mount portion 151 of the interchangeable lens 150 contacts to the mount portion 411 of the fixed mount member 410. At this time, the engaging claws 421a through 421c of the movable mount member 420 engage to the engaging claws 152a through 152c of the interchangeable lens 150 in the rotating direction. Accordingly, the interchangeable lens 150 is drawn to the side of the image-pickup-device unit 300, and is detachably attached to the lens adapter 400.

Figure 9A:
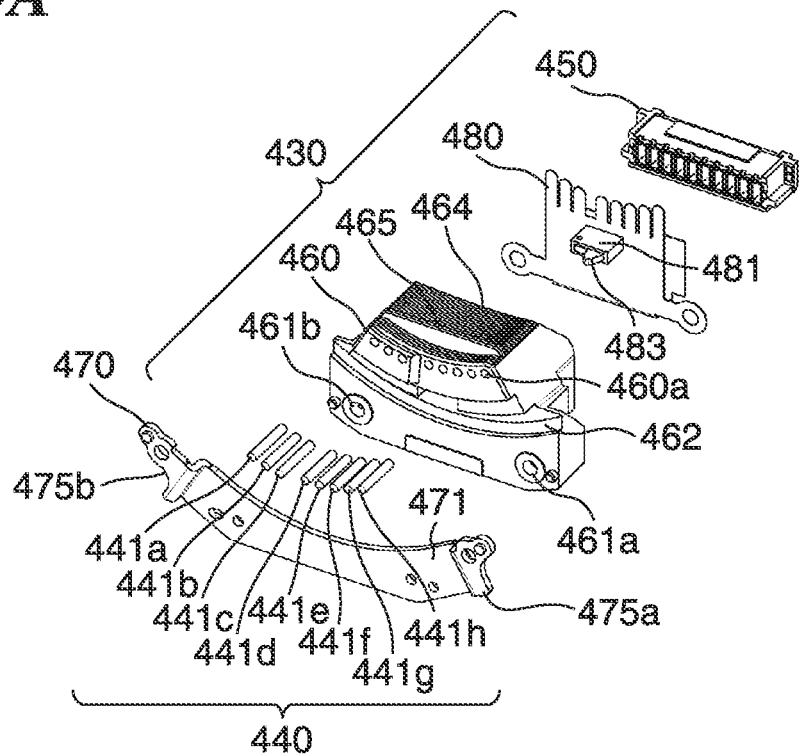
FIG. 9A is an exploded perspective view showing the electrical communication unit and a holding member of the lens adapter shown in FIG. 1 viewed from the front side.
Figure 9B:
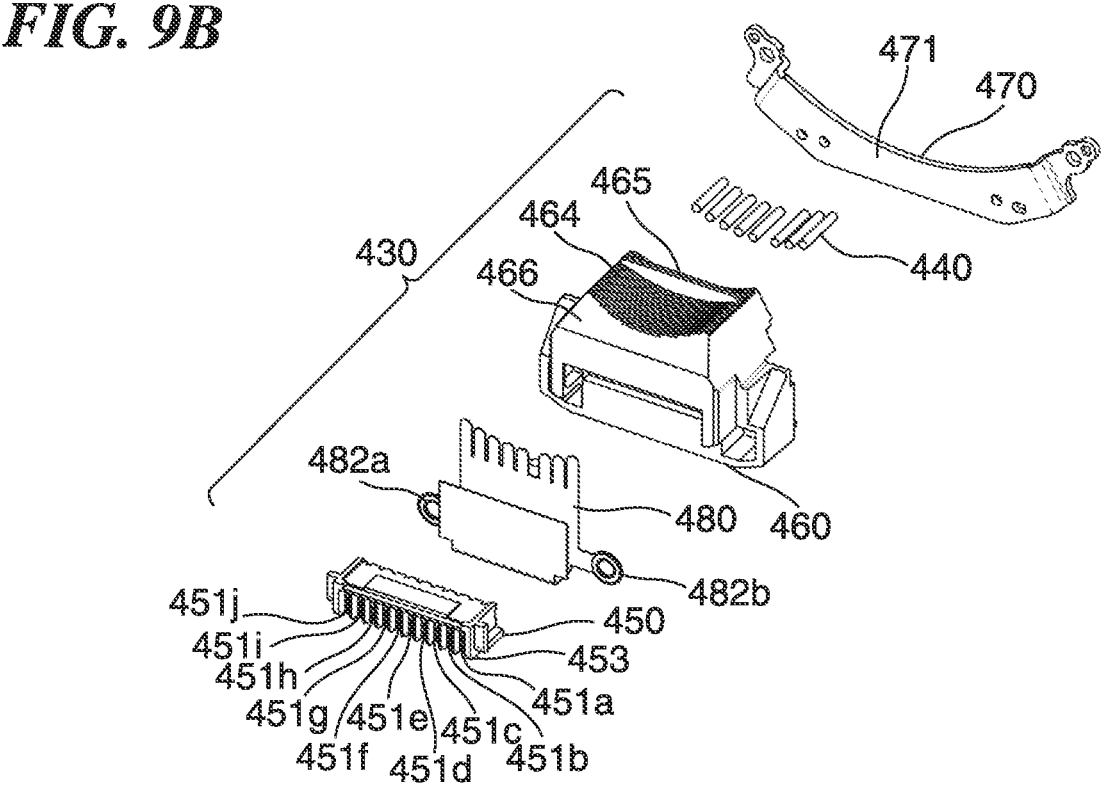
FIG. 9B is an exploded perspective view showing the electrical communication unit and the holding member shown in FIG. 9A viewed from the rear side.

FIG. 9A is an exploded perspective view showing the electrical communication unit 430 and the holding member 470 of the lens adapter 400 shown in FIG. 1 viewed from the front side. FIG. 9B is an exploded perspective view showing the electrical communication unit 430 and the holding member 470 shown in FIG. 9A viewed from the rear side.

As shown in FIG. 9A and FIG. 9B, the electrical communication unit 430 has electrical connecting portions 440 and 450, a support member 460 that supports the electrical connecting portion 440, and a flexible substrate 480 that electrically connects the electrical connecting portion 440 with the electrical connecting portion 450. The electrical communication unit 430 is held by the holding member 470. The electrical connecting portion 450 is equivalent to an example of the first electric connecting portion of the present invention, and the electrical connecting portion 440 is equivalent to an example of the second electrical connecting portion of the present invention.

The holding member 470 has a fixing portion 471 to which the electrical communication unit 430 is fixed, and arms 475a and 475b fixed to the fixed mount member 410. The electrical connecting portion 440 is electrically connected with the electrical connecting portion 153 of the interchangeable lens 150, and the electrical connecting portion 450 is electrically connected with the contact members 262a through 262j which constitute the terminal member 260 of the electrical communication unit 250 of the fixing unit 200.

The electrical connecting portion 440 has contact members 441a through 441h of pin shapes. The contact members 441a through 441h are supported by a plurality of bearing holes 460a formed in the front side of the support member 460. The contact members 441a through 441h are supported movably in the optical axis direction in a state where the contact members 441a through 441h are pushed to the side of the interchangeable lens 150 by energization members (not shown). The plurality of bearing holes 460a are circularly arranged around the optical axis.

A contact portion 462 to which the elastic member 490 contacts is provided in the front wall portion of the support member 460 under the plurality of bearing holes 460a. The contact portion 462 is circularly provided around the optical axis in the same manner as the plurality of bearing holes 460a. Moreover, screw insertion holes 461a and 461b are formed in both sides under the contact portion 462 of the support member 460.

A circular concave portion 464 circularly formed around the optical axis is provided in the upper surface of the support member 460. A shading wall portion 465 stands on the support member 460 at the front side of the circular concave portion 464. A notch portion 466 that inclines downward to the rear is provided in the rear side of the circular concave portion 464.

A mechanical switch 481 is implemented in the center of the front side of the flexible substrate 480. The mechanical switch 481 has the switch portion 483, and changes ON and OFF of the electrical communication between the interchangeable lens 150 and the camera body 100 when the switch portion 483 is pressed. In this embodiment, when the switch portion 483 is pressed, the electrical communication between the interchangeable lens 150 and the camera body 100 turns ON. Moreover, pattern exposed areas 482a and 482b are provided at the both sides of the flexible substrate 480 corresponding to the screw insertion holes 461a and 461b of the support member 460. The pattern exposed areas 482a and 482b are arranged along the circumference of the screw insertion holes 461a and 461b.

Figure 10:
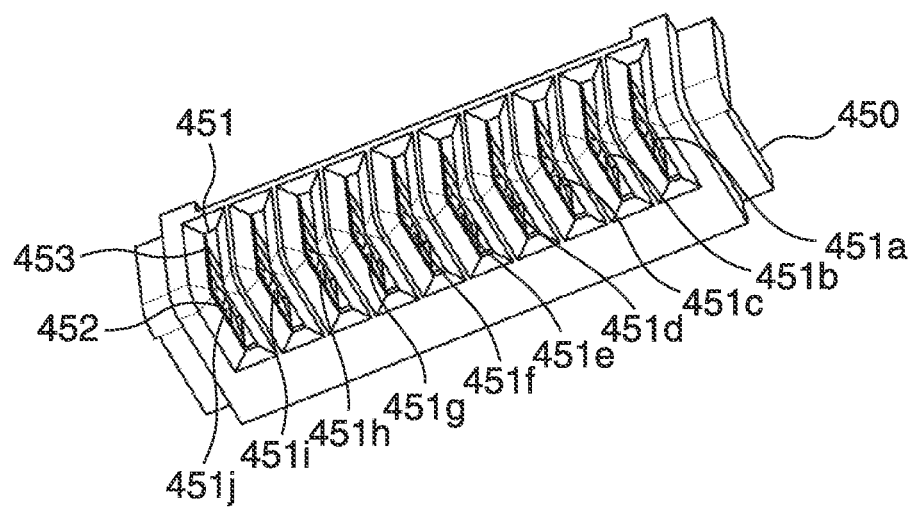
FIG. 10 is a perspective view of an electrical connecting portion of the electrical communication unit shown in FIG. 9A viewed from a lower-rear side.
Figure 11:
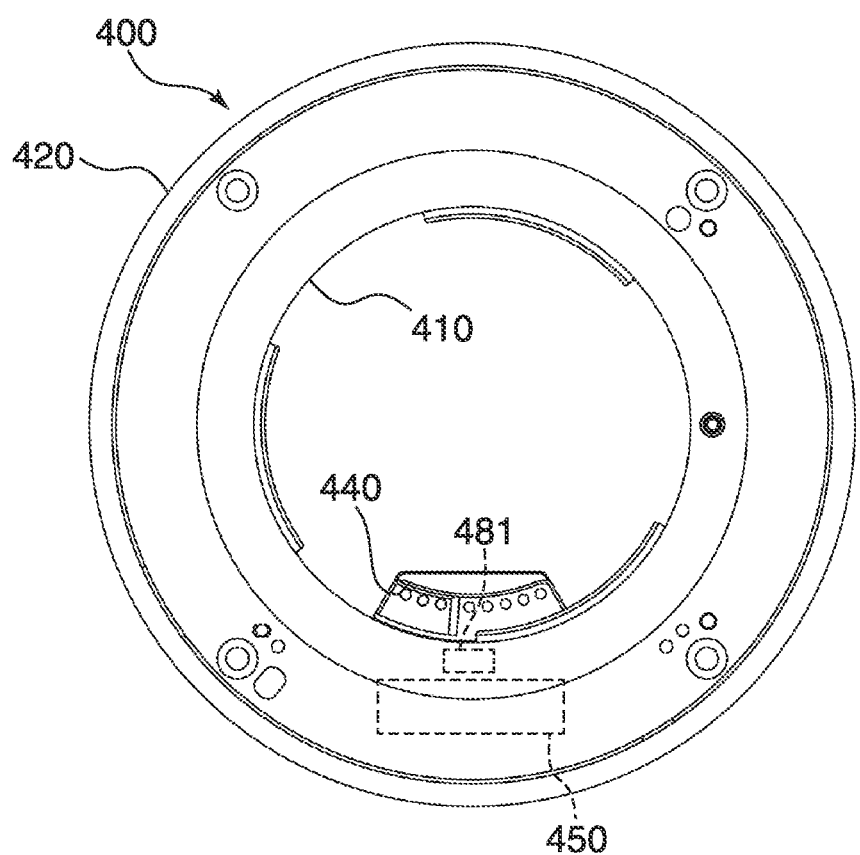
FIG. 11 is a view showing the lens adapter shown in FIG. 1 viewed from the front side in an optical axis direction.

FIG. 10 is a perspective view of the electrical connecting portion 450 of the electrical communication unit 430 shown in FIG. 9A viewed from a lower-rear side. FIG. 11 is a view showing the lens adapter 400 shown in FIG. 1 viewed from the front side in the optical axis direction.

As shown in FIG. 10, the electrical connecting portion 450 has a plurality of openings 451, and contact members 451a through 451j are respectively provided in the plurality of openings 451 corresponding to the contact members 262a through 262j that constitutes the electrical communication unit 250 of the fixing unit 200.

Each of the openings 451 consists of a bottom opening 452 and a rear opening 453. The bottom opening 452 opens to the bottom side of the camera body 100. The rear opening 453 continuously opens from the bottom opening 452 at the rear side of the camera body 100.

Moreover, as shown in FIG. 11, the electrical connecting portion 450 of the side of the camera body 100 (the side of the fixing unit 200) is arranged outside the electrical connecting portion 440 of the side of the interchangeable lens 150 in the radial direction. Such an arrangement enables the electrical connecting portion 450 to be covered with the electrical communication unit 250 of the fixed mount member 410 and the fixing unit 200.

Since this prevents a careless touch to the electrical connecting portion 450, it enables to prevent an electric contact surface from becoming dirty and to achieve stable electrical communication. Moreover, even when a lens adapter is exchanged to a lens adapter that needs a larger opening than the lens adapter 400 of this embodiment, there is a low possibility that the electrical connecting portion 450 is exposed, which enables to achieve stable electrical communication like the above.

Figure 12:
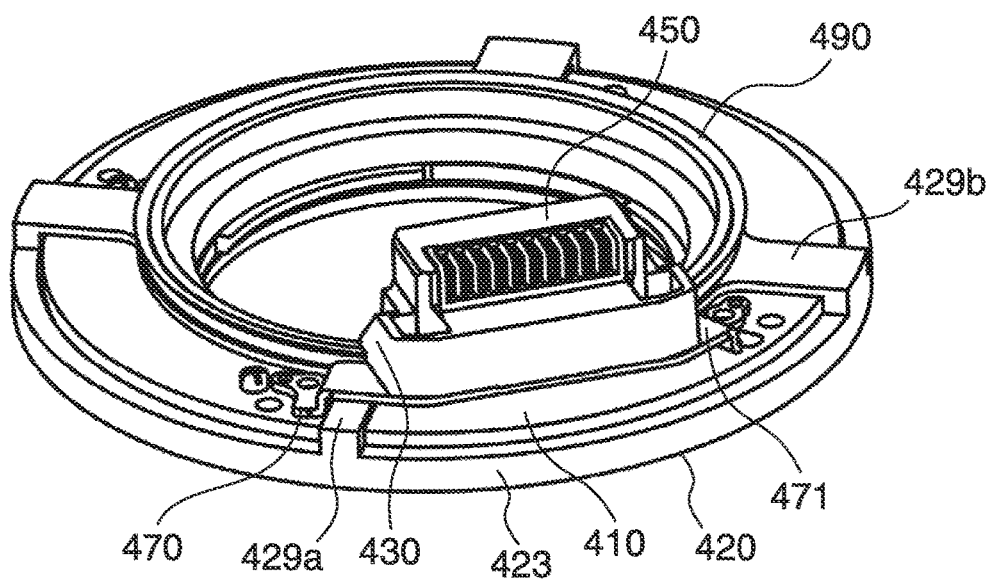
FIG. 12 is a perspective view showing the lens holding frame shown in FIG. 6 viewed from the rear side.

FIG. 12 is a perspective view showing the lens adapter 400 shown in FIG. 1 viewed from the rear side. When the interchangeable lens 150 is fixed to the lens adapter 400 by rotating the movable mount member 420, the arm 429c of the movable mount member 420 moves in the space formed between the fixing portion 471 of the holding member 470 and the fixed mount member 410, as shown in FIG. 12. Moreover, when external force is applied to the operating portion 423 of the movable mount member 420 in the state where the camera body 100 is equipped with the lens adapter 400, the arm 429c catches the force concerned and distributes it.

Figure 13A:
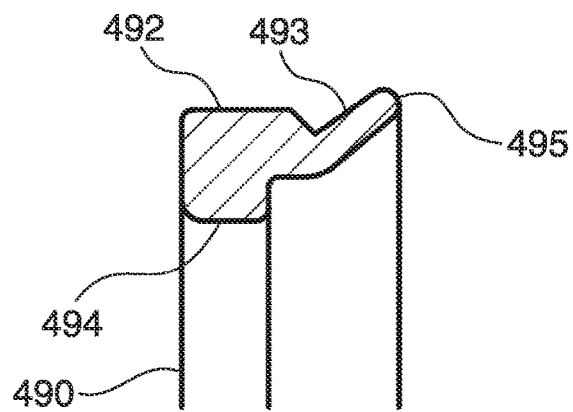
FIG. 13A is a sectional view of a main part of an elastic member shown in FIG. 8A in a natural state.
Figure 13B:
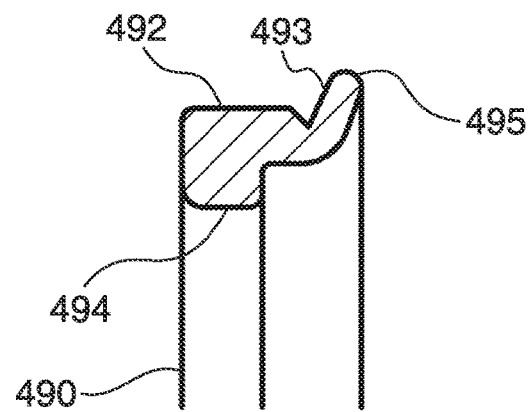
FIG. 13B is a sectional view of the main part of the elastic member in a state where the lens adapter is built into the camera body.
Figure 14:
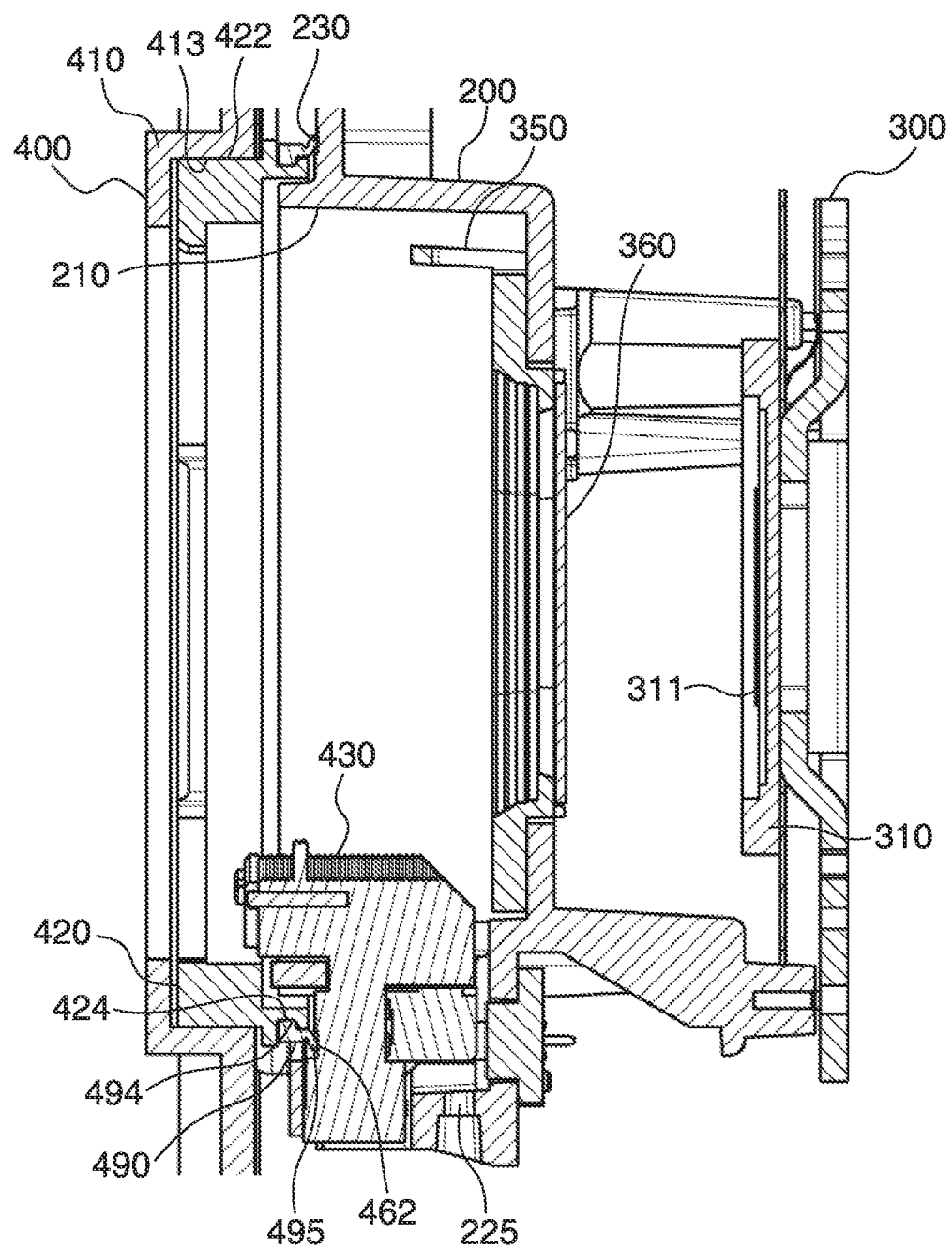
FIG. 14 is a sectional view of a main part showing a state where the lens adapter shown in FIG. 1 is built into the camera body.

FIG. 13A is a sectional view of a main part of the elastic member 490 shown in FIG. 8A in a natural state. FIG. 13B is a sectional view of the main part of the elastic member 490 in a state where the lens adapter 400 is built into the camera body 100. FIG. 14 is a sectional view of a main part showing a state where the lens adapter 400 shown in FIG. 1 is built into the camera body 100.

As shown in FIG. 13A and FIG. 13B, the elastic member 490 is formed in a ring shape by a first ring portion 492 arranged at the front side and a second ring portion 493 arranged at the rear side. The first ring portion 492 is fitted into the contact portion 424 of the movable mount member 420. In the fitting state, the first ring portion 492 deforms to expand outward in the radial direction so that an inner periphery 494 is in pressure contact with the inner side of the contact portion 424 of the movable mount member 420 in the radial direction.

The second ring portion 493 has a lip portion 495 that gradually expands outward in the radial direction towards the rear side (the side of the camera body 100). The lip portion 495 is formed being thinner than the first ring portion 492. Then, the lip portion 495 partially contacts with the circular contact portion 462 provided in the support member 460 of the electrical communication unit 430 fixed to the fixed mount member 410 in a state where the lip portion 495 is in pressure contact with the contact portion 462.

As shown in FIG. 14, the contact portion 462 at the side of the lens adapter 400 and the contact portion 230 at the side of the camera body 100 are arranged on a plane that approximately intersects perpendicularly with the optical axis, and are arranged to be approximately continuous in the circumferential direction, in the state where the lens adapter 400 is built into the camera body 100. Then, the lip portion 495 of the elastic member 490 is in pressure contact with the circular contact portion 230 provided in the fixing member 210 of the camera body 100. That is, a part of the lip portion 495 of the elastic member 490 in the circumferential direction contacts with the contact portion 462 at the side of the lens adapter 400, and the remaining part of the lip portion 495 in the circumferential direction contacts with the contact portion 230 at the side of the camera body 100.

In this case, the lip portion 495 of the second ring portion 493 deforms to compress in the optical axis direction and deforms to expand outward in the radial direction. That is, since the second ring portion 493 is in pressure contact with the contact portions 462 and 230 with falling deformation besides compressive deformation, the deformation amount of the second ring portion 493 becomes larger than that of the first ring portion 492.

This enables to always maintain the pressure contact state of the elastic member 490, even when the positions with which the elastic member 490 should be in pressure contact change because of a variation in the dimensional accuracy of parts, etc. (i.e., the position of the contact portion 462 of the support member 460 and the position of the contact portion 230 of the fixing member 210 change), for example. Moreover, a dustproof structure that prevents foreign substances, such as dust, from invading on the optical path of the interchangeable lens 150 is achieved, which enables to prevent foreign substances from adhering to the image pickup surface 311 of the image pickup device 310. Furthermore, a shading structure that prevents unnecessary light from invading on the optical path of the interchangeable lens 150 even if careless light emission occurs around the camera is achieved, which prevents the unnecessary light from entering to the image pickup surface 311 of the image pickup device 310.

The air hole 225 formed in the bottom portion of the fixing member 210 is arranged in an area where ventilation resistance between the lens adapter 400 and the image-pickup-device protection unit 350 is minimized in the state where the interchangeable lens 150 is attached to the camera body 100 through the lens adapter 400.

Accordingly, when air flows in this area due to a focusing operation, a zoom operation, etc. of the interchangeable lens 150, the air flows toward the air hole 225. That is, foreign substances, such as dust, which are floating in the area between the lens adapter 400 and the image-pickup-device protection unit 350, are guided to the air hole 225. When a cleaning filter, an adhesive, etc. is arranged in the air hole 225 to adhere foreign substances, it is avoidable that foreign substances remain in the area between the lens adapter 400 and the image-pickup-device protection unit 350.

Figure 15:
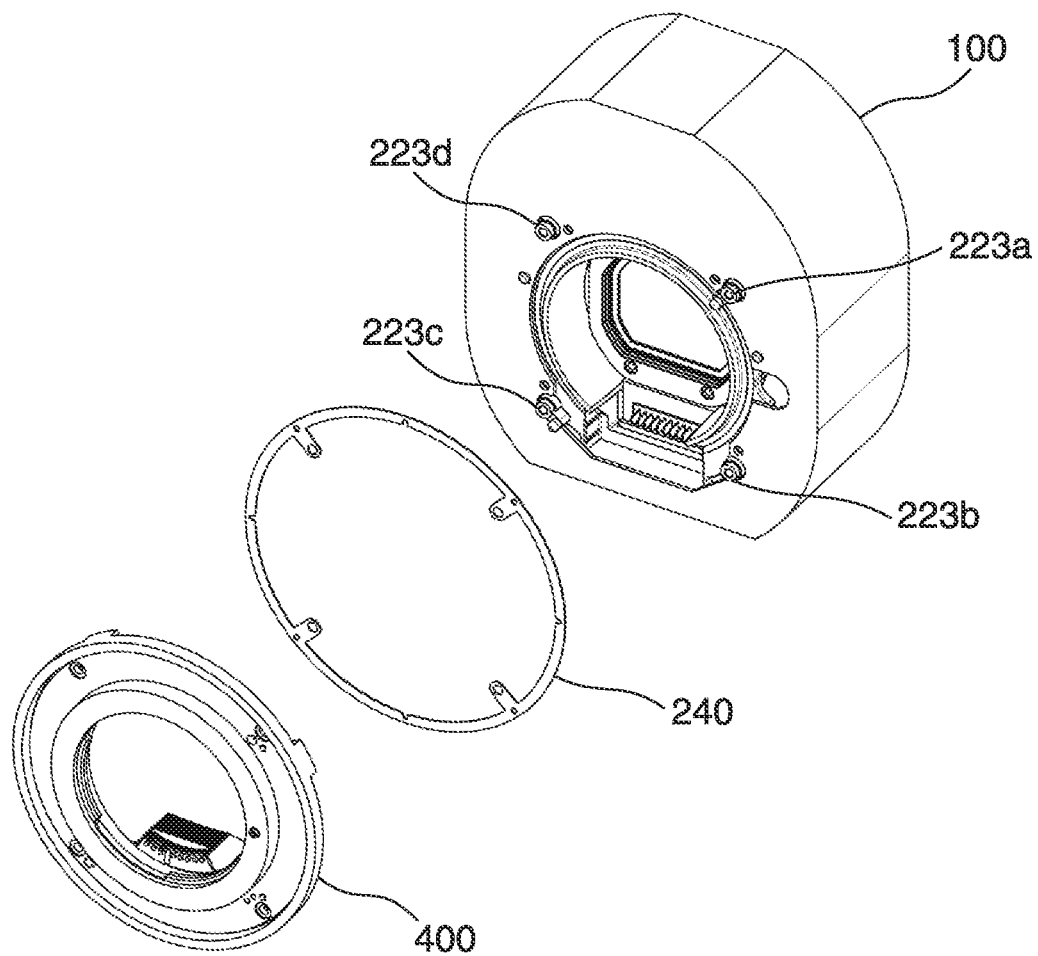
FIG. 15 is a perspective view showing how to attach the lens adapter to the camera body shown in FIG. 1 through a spacer.
Figure 16:
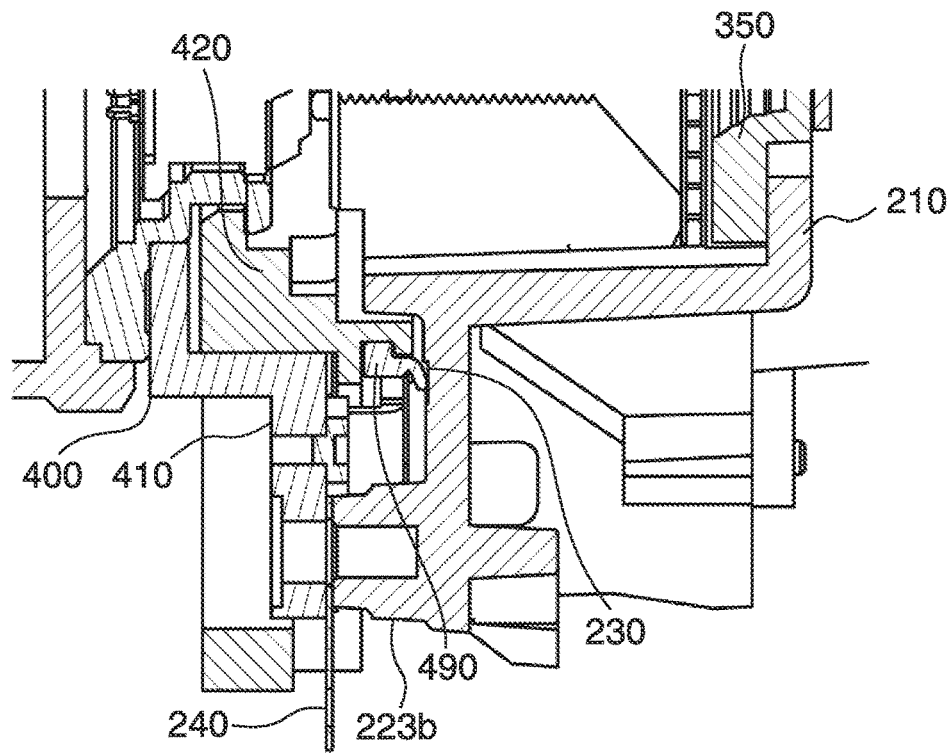
FIG. 16 is the sectional view of a main part showing a state where the interchangeable lens is attached to the lens adapter that is attached to the camera body shown in FIG. 1 viewed from a top side.

FIG. 15 is a perspective view showing how to attach the lens adapter 400 to the camera body 100 shown in FIG. 1 through a spacer 240. FIG. 16 is the sectional view of a main part showing a state where the interchangeable lens 150 is attached to the lens adapter 400 that is attached to the camera body 100 shown in FIG. 1 viewed from a top side.

As shown in FIG. 15 and FIG. 16, the lens adapter 400 is detachably attached to the fixing portions 223a through 223d provided in the fixing member 210 of the camera body 100 through the spacer 240 with screws inserted into the screw insertion holes 414a through 414d of the fixed mount member 410. In this case, it becomes possible to adjust the flange back by changing the thickness of the spacer 240. It should be noted that means for fixing the lens adapter 400 to the camera body 100 is not limited to a screw. Another fixing means may be employed.

Figure 17:
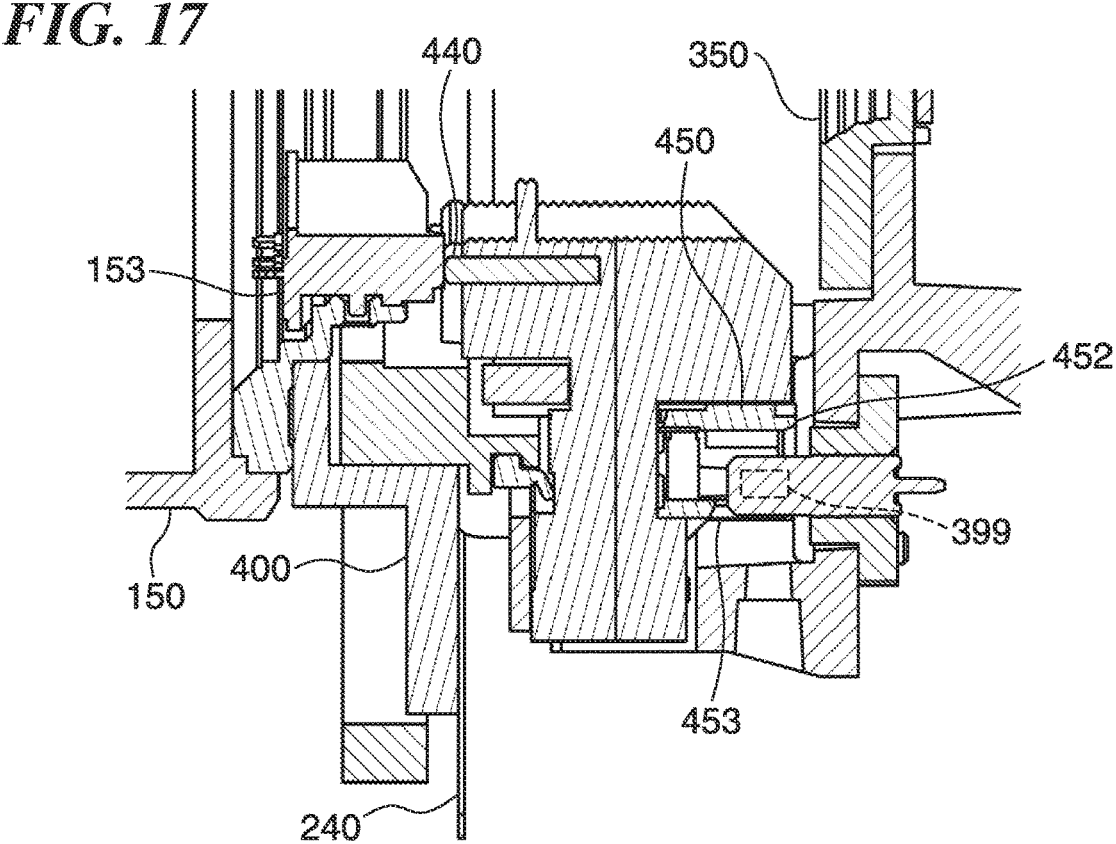
FIG. 17 is a sectional view of the main part showing the state where the interchangeable lens is attached to the lens adapter that is attached to the camera body shown in FIG. 1 viewed from a side face side.

FIG. 17 is a sectional view of the main part showing the state where the interchangeable lens 150 is attached to the lens adapter 400 that is attached to the camera body 100 shown in FIG. 1 viewed from a side face side. As shown in FIG. 17, the electrical connecting portion 153 of the interchangeable lens 150 is electrically connected to the electrical connecting portion 440 of the electrical communication unit 430 of the lens adapter 400.

Moreover, the electrical connecting portion 450 of the electrical communication unit 430 of the lens adapter 400 is electrically connected to the terminal member 260 of the electrical communication unit 250 of the camera body 100 within an area 399 in FIG. 17. This enables electric communication between the interchangeable lens 150 and the camera body 100.

Figure 18:
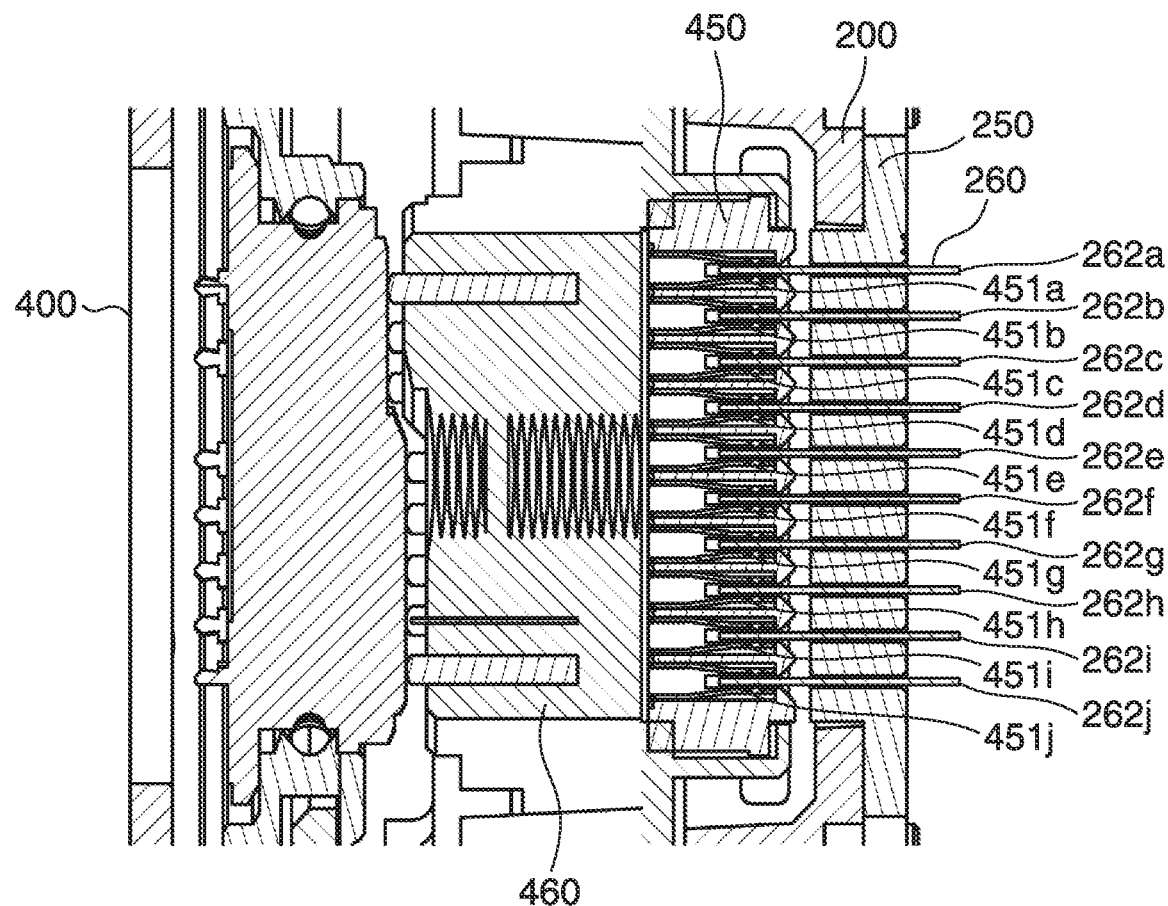
FIG. 18 is a sectional view of a main part showing a state where a plurality of contact members of the electrical communication unit of the lens adapter shown in FIG. 9A are electrically connected with a plurality of contact members of the electrical communication unit of the camera body.
Figure 19:
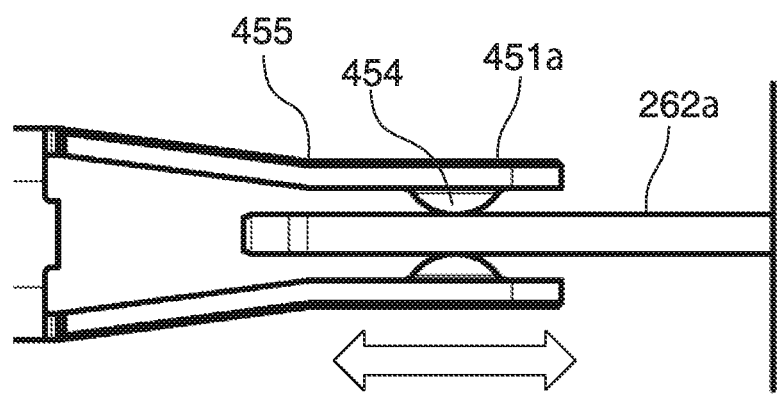
FIG. 19 is an enlarged view showing an electrical connecting state of the contact member of the lens adapter and the contact member of the camera body shown in FIG. 18.

FIG. 18 is a sectional view of a main part showing a state where the plurality of contact members 451a through 451j of the electrical connecting portion 450 (the side of the lens adapter 400) shown in FIG. 9A are electrically connected with the plurality of contact members 262a through 262j of the terminal member 260 (the side of the camera body 100). FIG. 19 is an enlarged view showing an electrical connecting state of the contact member 451a of the electrical connecting portion 450 and the contact member 262a of the terminal member 260 shown in FIG. 18.

When the flange back is adjusted, the contact positions between the contact members 451a through 451j of the electrical connecting portion 450 and the contact members 262a through 262j of the terminal member 260 vary in the optical axis direction (an arrow direction in FIG. 19) according to the amount of change of the thickness of the spacer 240. These contact positions vary in the optical axis direction within the area 399 shown in FIG. 17. It should be noted that the length of the area 399 in the optical axis direction is set up so as to be sufficiently longer than the amount of change of the thickness of the spacer 240, i.e., the adjustment amount of the flange back.

In this embodiment, the plurality of contact members 262a through 262j of the terminal member 260 at the side of the camera body 100 are respectively constituted by the plate terminals prolonged in the optical axis direction, and are arranged at the bottom side of the camera body 100 as mentioned above. Then, as shown in FIG. 18, the plurality of contact members 262a through 262j are arranged side by side in the situation where the surfaces of plates are mutually opposite in the width direction (the vertical direction in FIG. 18) of the camera body 100 that intersects perpendicularly with the optical axis, and form the comb-shaped terminals.

On the other hand, as shown in FIG. 19, the plurality of contact members 451a through 451j of the electrical connecting portion 450 at the side of the lens adapter 400 are formed in shapes of comb teeth with a plurality of pairs of elastic contact pieces 455 that respectively nip the plates of the contact members 262a through 262j of the terminal members 260 therebetween in the plate thickness direction.

When the pair of elastic contact pieces 455 that constitute the contact member 451a are described as an example, the pair of elastic contact pieces 455 are pushed so as to nip the plate of the contact member 262a of the terminal member 260 therebetween in the plate thickness direction, and are slidable in the optical axis direction with respect to the contact member 262a. Moreover, contact portions 454, which contact with the plate of the contact member 262a, of the pair of the elastic contact pieces 455 are formed in a sphere form.

This enables to keep contact pressure constant, even if the contact positions between the contact members 451a through 451j at the side of the lens adapter 400 and the contact members 262a through 262j at the side of the camera body 100 vary in the optical axis direction according to the change of the thickness of the spacer 240. This avoids deterioration of a self-cleaning performance of the contact surface resulting from change of the contact pressure, deterioration of durability of plating peeling etc., and deterioration of conduction reliability during vibration (i.e., deterioration of reliability about electrical connections).

Figure 20:
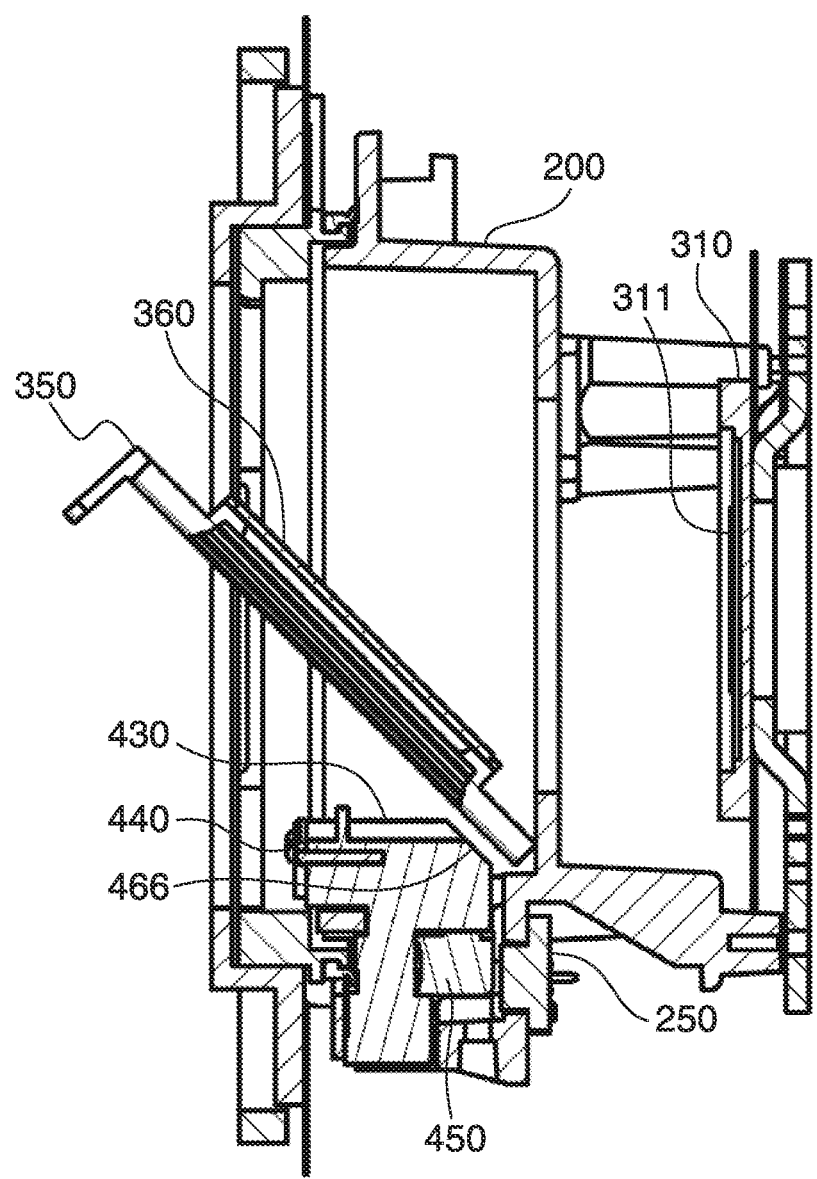
FIG. 20 is a sectional view of a main part showing how to detach the image-pickup-device protection unit from the fixing unit of the camera body shown in FIG. 1.

FIG. 20 is a sectional view of a main part showing how to detach the image-pickup-device protection unit 350 from the fixing unit 200 of the camera body 100 shown in FIG. 1. When foreign substances adhere to the image pickup surface 311 of the image pickup device 310, the foreign substances adhered to the image pickup surface 311 can be removed after detaching the image-pickup-device protection unit 350 from the front side of the camera body 100 as shown in FIG. 20.

As mentioned above, the electrical connecting portion 450 of the electrical communication unit 430 at the side of the camera body 100 is arranged outside the electrical connecting portion 440 at the side of the interchangeable lens 150 in the radial direction in this embodiment. Accordingly, the electrical communication unit 250 of the fixing unit 200 electrically connected to the electrical connecting portion 450 is also arranged outside the electrical connecting portion 440 in the radial direction. This arrangement enables to support the situation where the image-pickup-device protection unit 350 becomes larger as the effective area of the glass member 360 becomes larger according to enlargement of the image pickup device.

As mentioned above, according to the embodiment, the dustproof performance between the lens adapter 400 and the apparatus body 100 is ensured even when the lens adapter 400 has the electrical communication unit 430. Moreover, the reliability of the electric connection between the lens adapter 400 and the apparatus body 100 is ensured with the simple configuration even when the spacer 240 is inserted between the lens adapter 400 that has the electrical communication unit 430 and the apparatus body 100.

It should be noted that the present invention is not limited to what has been described in the above-mentioned embodiment, quality of the material, a shape, a size, a formation, the number of elements, arrangement locations, etc., can be changed suitably unless it is deviated from the scope of the present invention.

For example, although the contact members 451a through 451j at the side of the lens adapter 400 are configured as the comb-shaped terminal consisting of the plurality of pairs of elastic contact pieces 455 and the contact members 262a through 262j at the side of the camera body 100 are configured as the comb-shaped terminal consisting of the plurality of plate terminals in the above-mentioned embodiment, the present invention is not limited to the embodiment. Namely, the contact members 451a through 451j at the side of the lens adapter 400 may be configured as the plurality of plate terminals and the contact members 262a through 262j at the side of the camera body 100 may be configured as the plurality of pairs of elastic contact pieces 455.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Applications No. 2015-071987 and No. 2015-071988, filed Mar. 31, 2015, which are hereby incorporated by reference herein in their entireties.

What is claimed is:
1. An apparatus body of an image pickup apparatus which is detachably attachable to a lens adapter comprising:
an image capturing device; and
a comb-shaped terminal comprising a plurality of plate terminals electrically connectable with an external device,
wherein the plurality of plate terminals of the comb-shaped terminal project in a direction parallel to an optical axis,
wherein the plurality of plate terminals of the comb-shaped terminal are arranged linearly side by side in a perpendicular direction to the optical axis direction, with surfaces of the plate terminals being mutually opposite,
wherein the lens adapter includes a first terminal on one side of the lens adapter and a second terminal on the other side of the lens adapter, opposite the first terminal in the direction parallel to the optical axis,
wherein, in a case of viewing the apparatus body from the optical axis thereof toward an outside of the apparatus body, the comb-shaped terminal is electrically connectable with the first terminal, arranged to be placed at the same side as the second terminal with respect to the optical axis, and arranged at an outer position from the optical axis than the second terminal, in a state where the lens adapter is attached to the apparatus body, wherein in the apparatus body, a spacer is able to be inserted between the apparatus body and the lens adapter in order to finely adjust a flange back, and wherein a length of a predetermined area, within which a contact point of the comb-shaped terminal with the first terminal is able to vary relatively, is sufficiently longer than an adjustment amount of the flange back.

2. The apparatus body of the image pickup apparatus according to claim 1, wherein the plurality of plate terminals of the comb-shaped terminal are arranged side by side in a width direction of the apparatus body that intersects perpendicularly to the optical axis direction.

3. The apparatus body of the image pickup apparatus according to claim 1, wherein, in a state where the external device is not attached to the apparatus body, the comb-shaped terminal is exposed out of the apparatus body, and wherein, in a state where the external device is attached to the apparatus body, the comb-shaped terminal is not exposed out of the apparatus body.

4. A lens adapter which is detachably attached on an apparatus body of the image pickup apparatus, comprising:

a first terminal electrically connectable with a first comb-shaped terminal of the apparatus body, a second terminal electrically connectable with a terminal of an interchangeable lens, wherein the second terminal is opposite the first terminal in a direction parallel to an optical axis, and a second mount portion being in contact with a first mount portion provided on the interchangeable lens, in a state where the interchangeable lens is mounted on the lens adapter, wherein the first terminal is formed in a comb-shaped, wherein a contact position of the first comb-shaped terminal and the first terminal is slidable relatively in the optical axis direction with respect to the second mount portion, wherein, in a case of viewing the lens adapter from the optical axis thereof toward an outside of the lens adapter, the first terminal is located within a same angle range in a circumferential direction of the second mount portion within which the second terminal is included, and the first terminal is arranged further away from the optical axis than the second terminal, and wherein a length of a predetermined area, within which a contact point of the first terminal with the first comb-shaped terminal is able to vary relatively, is sufficiently longer than an adjustment amount of a flange back adjusted by a spacer which is able to be inserted between the lens adapter and the apparatus body.

5. The lens adapter according to claim 4, wherein, in a state where the lens adapter is attached on the apparatus body, the first terminal is not exposed out of the lens adapter.

6. The lens adapter according to claim 5, wherein the first comb-shaped terminal of the apparatus body comprises a plurality of plate terminals projecting in the direction parallel to the optical axis, and wherein the first terminal is a second comb-shaped terminal in a shape of female corresponding to the first comb-shaped terminal.

* * * * *